US011266241B2

(12) United States Patent
Timenes

(10) Patent No.: US 11,266,241 B2
(45) Date of Patent: Mar. 8, 2022

(54) STABILIZING DEVICE FOR A PIECE OF FURNITURE OR A DEVICE

(71) Applicant: WHEEL.ME AS, Oslo (NO)

(72) Inventor: Atle Timenes, Snarøya (NO)

(73) Assignee: WHEEL.ME AS, Oslo (NO)

( * ) Notice: Subject to any disclaimer, the term of this patent is extended or adjusted under 35 U.S.C. 154(b) by 0 days.

(21) Appl. No.: 16/349,805

(22) PCT Filed: Nov. 16, 2017

(86) PCT No.: PCT/EP2017/079441
§ 371 (c)(1),
(2) Date: May 14, 2019

(87) PCT Pub. No.: WO2018/091584
PCT Pub. Date: May 24, 2018

(65) Prior Publication Data
US 2019/0357680 A1  Nov. 28, 2019

(30) Foreign Application Priority Data
Nov. 17, 2016  (EP) ..................................... 16199301

(51) Int. Cl.
*A47B 91/16* (2006.01)
*A47B 91/02* (2006.01)
*B60B 33/06* (2006.01)

(52) U.S. Cl.
CPC .............. *A47B 91/02* (2013.01); *A47B 91/16* (2013.01); *A47B 2220/003* (2013.01);
(Continued)

(58) Field of Classification Search
CPC ............ A47B 2200/0056; A47B 91/16; A47B 2200/006; B60B 33/063
See application file for complete search history.

(56) References Cited

U.S. PATENT DOCUMENTS 2,671,242 A * 3/1954 Lewis ..................... B60B 33/08
16/33
2,937,879 A * 5/1960 Lion ....................... B65D 90/18
280/43.21
(Continued)

FOREIGN PATENT DOCUMENTS

CN           1878487       12/2006
CN          103315519       9/2013
(Continued)

OTHER PUBLICATIONS

Search Report dated Jun. 21, 2020 in corresponding Chinese Patent Application No. 2017800766277.
(Continued)

*Primary Examiner* — Bradley Duckworth
(74) *Attorney, Agent, or Firm* — Wenderoth, Lind & Ponack, L.L.P.

(57) ABSTRACT

A stabilizing device for a piece of furniture including a housing with a piston opening, and a piston element mounted movably within the housing and moveable at least partly out of the piston opening for engagement with a supporting surface. The stabilizing device further includes an actuator, including a motor, connected to the piston element for actuating a movement of the piston. A control unit connected to the actuator for control of the actuation of the piston element, and at least one first sensor capable of measuring the load on the motor. The at least one first sensor device is connected to the control unit such that the movement of the piston element can be controlled based on input from the first sensor.

10 Claims, 3 Drawing Sheets

(52) U.S. Cl.
CPC ..... *A47B 2220/0097* (2013.01); *B60B 33/063* (2013.01); *B60B 2200/20* (2013.01)

(56) References Cited

U.S. PATENT DOCUMENTS

| | | | |
|---|---|---|---|
| 5,143,386 A | | 9/1992 | Uriarte |
| 5,285,995 A | * | 2/1994 | Gonzalez ................ G05D 19/02 248/550 |
| 6,164,429 A | * | 12/2000 | Masciarelli, Jr. ...... B65G 13/12 193/35 SS |
| 6,352,037 B1 | * | 3/2002 | Doyle ....................... A47B 9/00 108/147 |
| 8,302,743 B2 | * | 11/2012 | Pike ......................... F16M 7/00 188/151 R |
| 8,464,372 B2 | * | 6/2013 | Mitchell .................. A47D 9/02 5/109 |
| 8,674,572 B2 | * | 3/2014 | Dietrich ................. H02K 11/21 310/83 |
| 10,470,562 B2 | * | 11/2019 | Laing ........................ A47B 9/00 |
| 10,759,222 B2 | * | 9/2020 | Libakken ............ B60B 33/0047 |
| 2007/0018145 A1 | * | 1/2007 | Wang ........................ B66F 3/12 254/126 |
| 2009/0065752 A1 | * | 3/2009 | Doyle ........................ B66F 1/08 254/93 R |
| 2009/0299689 A1 | | 12/2009 | Stubben |
| 2010/0237205 A1 | * | 9/2010 | Hirsh ...................... A47C 7/008 248/188.4 |
| 2012/0286221 A1 | * | 11/2012 | Doyle ....................... A47B 9/10 254/98 |
| 2015/0007756 A1 | | 1/2015 | Kollreider et al. |
| 2016/0260019 A1 | | 9/2016 | Riquelme Ruiz et al. |
| 2016/0339742 A1 | * | 11/2016 | Libakken .............. B60B 33/063 |
| 2019/0029412 A1 | * | 1/2019 | Gibson .................... H04Q 9/04 |
| 2019/0252902 A1 | * | 8/2019 | Koch ...................... H02J 50/20 |
| 2020/0221863 A1 | * | 7/2020 | Laing ....................... A47B 9/04 |

FOREIGN PATENT DOCUMENTS

| | | |
|---|---|---|
| CN | 205267384 | 6/2016 |
| CN | 106068191 | 11/2016 |
| EP | 2 522 619 | 11/2012 |
| WO | 2007/087807 | 8/2007 |
| WO | 2015/118493 | 8/2015 |

OTHER PUBLICATIONS

International Search Report dated Dec. 6, 2017 in International (PCT) Application No. PCT/EP2017/079441.

Office Action dated Oct. 27, 2021 in corresponding Japanese Patent Application No. 2019-526475, with English Translation.

\* cited by examiner

STABILIZING DEVICE FOR A PIECE OF FURNITURE OR A DEVICE

The present invention relates to a stabilizing device for a piece of furniture or a device, a piece of furniture or a device comprising a stabilizing device and methods for stabilizing and for levelling a piece of furniture or a device.

When a piece of furniture or a device, such as a bed, a table, a washing machine, medical equipment, various types of machines and so on, are placed on a supporting surface, for example a floor, most of the time it is desirable that the piece of furniture or the device is stable, i.e. the piece of furniture or the device is not rocking back and forth in any way. Often it is also desirable to be able to level the piece of furniture or the device, normally relative to a horizontal plane. A known way to stabilize or to level a piece of furniture is to provide that piece of furniture with a number of telescoping legs that can be locked in a number of given position, for example by providing the telescoping leg with resilient studs that can be pushed in while the telescoping leg is being telescoped and release it in a desired position where the stud fits into a complementary hole in the cylindrical sleeve element in which telescoping leg telescopes. The problem with this solution is that the piece of furniture must be lifted during this process which can be difficult if the piece of furniture is heavy, and it can also be difficult to find the exact position to place the stud and sometimes the optimal position is between two adjacent holes making it impossible to obtain a perfectly stabilized or levelled piece of furniture. Another commonly used solution for stabilizing or levelling a piece of furniture is to provide the piece of furniture with screw elements that can be screwed into and out of the piece of furniture and where a support member is attached to the end of the screw elements that rest on the support surface. This is also a time consuming operation and can be difficult to carry out if the piece of furniture is heavy.

An objective of the present invention is therefore to provide a device that can be used to stabilize and/or level a piece of furniture or a device in a way that is easy to carry out for a person, and which can stabilize and/or level a piece of furniture or a device accurately and quickly.

These objectives are achieved with a stabilizing device according to a first aspect of the invention, a piece of furniture or a device according to a second aspect of the invention, a method for stabilizing a piece of furniture or a device according to a third aspect of the invention and a method for levelling a piece of furniture or a device according to a fourth aspect of the invention. Further embodiments of the invention are described according to additional aspects of the invention.

There is provided a stabilizing device for a piece of furniture or a device for stabilization of the piece of furniture or the device on a supporting surface, where the stabilizing device comprises:

- a housing with a piston opening in one end of the housing,
- a piston element which is mounted movably within the housing and at least partly out of the piston opening for engagement with the supporting surface, the piston element being connected to a motor for actuation of a movement of the piston element,
- a control unit which is signally connected to the motor, for control of the actuation of the piston element,
- at least one first sensor device that is capable of measuring the load on the motor, where the at least one sensor device is signally connected to the control device such that the movement of the piston element can be controlled based on input from the at least one first sensor.

With the stabilizing device above included in a piece of furniture or a device, the stabilizing device can be started by a pushing a single button on a sender device, typically on standard a remote control or on a mobile phone with an app installed that communicates wirelessly with the control unit of the stabilizing unit. The control unit preferably has a receiver device that is capable of receiving wireless signals and convey them to the control unit. The receiver device and the control unit may of course also be provided as separate devices where the receiver device and the control unit are signally connected to each other, wirelessly or via a signal cable. The stabilizing devices of the piece of furniture or the device may also be signally connected, either wirelessly or via a signal cable.

The at least one first sensor device is preferably a load measuring device which measures the load on the motor or any other type of sensor that can be used register that the load on the motor is changing.

The piston is movable within a cylinder space in the housing of the stabilizing device. The piston may further comprise a rolling element at the end of the piston, that faces the supporting surface, and that can be moved out of the piston opening of the housing. Alternatively, the piston element may not comprise a rolling element and the piston element itself may be in contact with the supporting surface. In this case, a support element which may be attached to the piston at the end of the piston that can be moved out of the piston opening of the housing. This support element may for example, be made of a rubber material or any other sufficiently soft material to avoid damage to the supporting surface.

The stabilizing device may further comprise a locking device for locking the piston element in a desired position relative to the housing.

Furthermore, the stabilizing device may comprises a receiver device capable of receiving a wireless signal. The receiver device is preferably being signally connected to the control unit.

The motor is preferably an electric motor, and the at least one sensor device is preferably adapted to measure the electric current that the motor is consuming.

Alternatively, the motor is a gas motor or a hydraulic motor and the at least one first sensor device may be a pressure measuring device which measures the pressure of the gas or the hydraulic fluid driving the motor.

The stabilizing device may further comprise at least one second sensor device which is capable of sensing the position of a first surface of a piece of furniture or a device relative to a reference surface which is typically a horizontal plane or a vertical plane.

There is also provided a piece of furniture or a device comprising at least one stabilizing device as described above, where the at least one stabilizing device is mounted to or within the piece of furniture or the device, and where the piston element of the at least one stabilizing device faces the supporting surface on which the piece of furniture or the device is supported. The piece of furniture or the device is typically a table, a bed, a cabinet, a desk or any other form of furniture, or it may be appliances like washing machines, refrigerators and so on, or machines or equipment for workshops, hospitals, universities or other types of research and/or educational facilities and so on, or any other device that needs to be stabilized and/or levelled, typically horizontally or vertically.

The piece of furniture or the device may comprise a plurality of stabilizing devices and the control units of the plurality of stabilizing devices are preferably signally interconnected, preferably with wireless signals. The control unit may therefore comprise a sender and a receiver of wireless signals.

During stabilization of the piece of furniture or the device, when the piece of furniture or the device is unstable, i.e. it is rocking back and forth, the first sensor devices will register the load on the motor trying to push the piston element out of each of the stabilization devices. The load on a motor which is just pushing a piston element into the air because the piece of furniture or the device is lifted up from the supporting surface at this position, is of course much smaller than the load on a motor which is trying to push out a piston which is resting on the supporting surface, i.e. trying to lift the piece of furniture or the device. The control unit can therefore determine which stabilizing device or devices has or have a piston element that is lifted from the support surface and actuate only these pistons until they hit the supporting surface when the load on the motor of this or these motors will quickly start to rise because the motors will now have to lift the piece of furniture or the device up from the support surface in order to further push the piston element out. At the point when all the pistons rest on the supporting surface, the control unit can turn off the motors.

The stabilizing device or the piece of furniture or the device may comprise a first surface and at least one second sensor device, where the at least one second sensor device is capable of registering the position of the first surface or the position of the piston element within the housing. The at least one second sensor device may comprise an accelerometer and/or a gyro and/or a magnetometer.

There is also provided method for stabilizing a piece of furniture or a device as described above comprising at least one stabilizing device as described above, where the method comprises the steps of:
  position the piece of furniture or the device on a supporting surface,
  test if the piece of furniture or the device is unsteady or not, and, if the piece of furniture or the device is unsteady,
  send a wireless start signal to the at least one stabilizing device, whereby the piston element is moved by the motor out of the housing of the stabilizing device until the piston element is in contact with the supporting surface, and
  stopping the movement of the piston element when the at least one first sensor device registers a load on the motor that exceeds a predetermined load.

The at least one piston element being moved in or out of its housing, may be locked in its position relative to the housing when the piece of furniture or the device has been stabilized.

There is also provided method for levelling a piece of furniture or a device as described above comprising a plurality of stabilizing device as described above, the method comprising the steps of:
  position the piece of furniture or the device on a supporting surface,
  sending a wireless start signal to at least one of the stabilizing devices to level the piece of furniture or the device, whereby the control unit tests if the first surface of the piece of furniture or the device is parallel to a reference surface or not, and if the first surface is not parallel to the reference surface,
  moving the piston element of at least one of the stabilizing devices out of or into its housing until the first surface of the piece of furniture or the device is parallel to the reference surface.

The at least one piston element being moved in or out of its housing, may be locked in its position relative to the housing when the first surface of the piece of furniture or the device is parallel to the reference surface. The reference surface is typically a horizontal surface.

It should be mentioned that the reference surface is not a real surface, but rather a desired reference surface. Relevant data defining this desired reference surface can be stored in the control unit whereby a reference surface exists that the first surface of the piece of furniture or the device can be compared with during the levelling of the piece of furniture or the device. Typically, the reference surface is a horizontal plane so that one or several or all of the stabilizing devices of the piece of furniture or the device can be adjusted until a plane, first surface of the piece of furniture or the device is parallel to the reference surface, i.e. the first surface of the piece of furniture or the device is horizontal.

BRIEF DESCRIPTION OF THE DRAWINGS

A non-limiting example of the present invention will now be described in detail with reference to the figures where.

DETAILED DESCRIPTION OF PREFERRED EMBODIMENTS

It should be noted that the same or similar technical features have been given the same reference numbers in all the figures.

Figure 1:
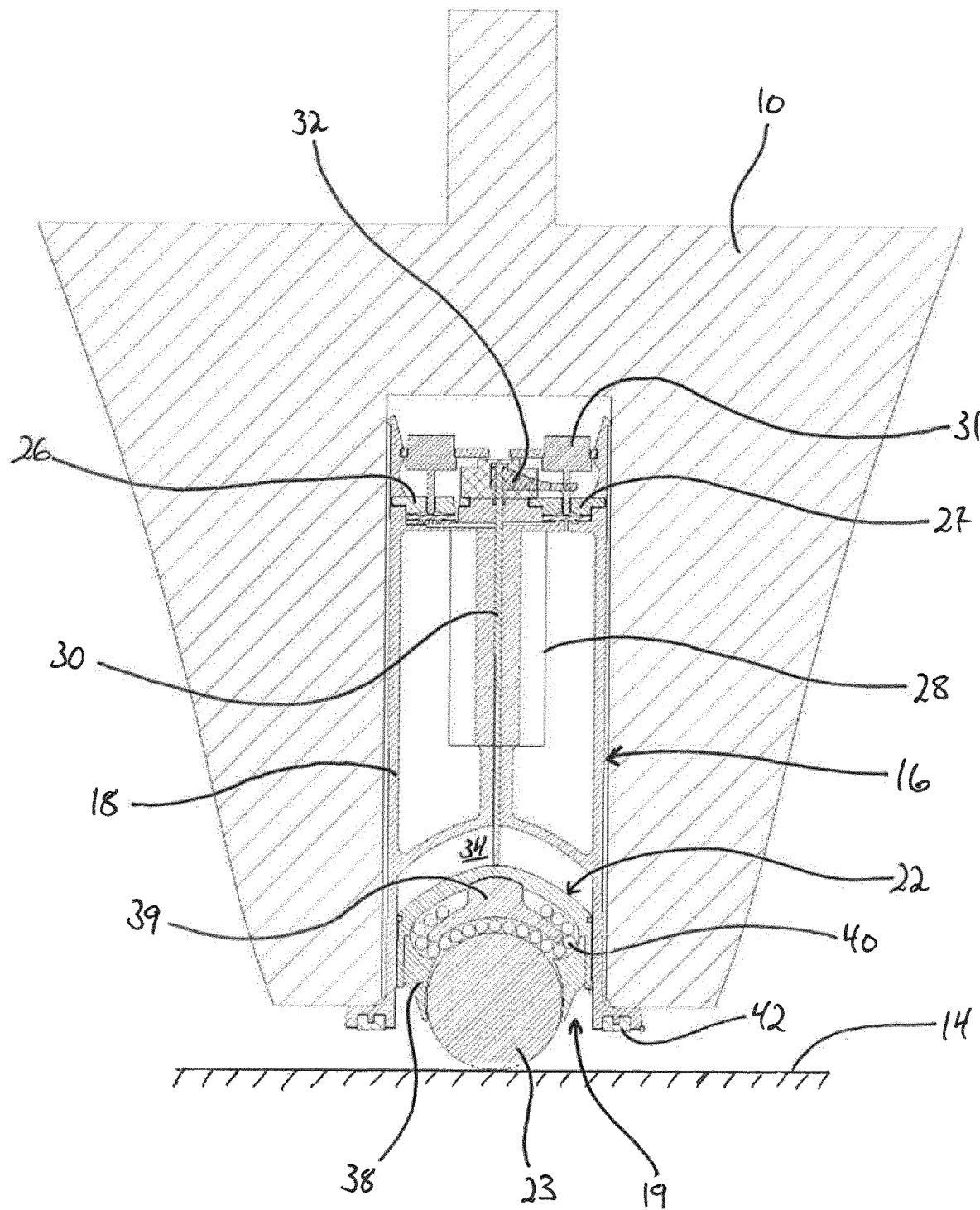
FIG. 1 is a schematic illustration of a section through a piece of furniture or a device provided with a stabilizing device according to the present invention.

In FIG. 1 there is shown a stabilizing device 16 which is mounted in a recess in a piece of furniture or a device 10 which, in this example, is a leg element of a larger piece of furniture or device (not shown on the figure). The stabilizing device comprises a housing 18 with a size and shape that corresponds to that of the recess in the piece of furniture or the device.

The housing 18 is provided with a cylindrical shape and a piston opening 19 in one end of the housing. The stabilizing device 16 is mounted on or in the piece of furniture or the device 10 such that the piston opening 19 faces a supporting surface 14 which supports the piece of furniture or the device 10. From the piston opening 19 into the interior of the housing 18 there is provided a cylinder space 34 in which there is provided a piston element 22 which can be moved in and out of the cylinder space 34.

The piston element 22 shown in FIG. 1 comprises a rolling element 23 which is held in the piston element 22 with one or more holding elements 38 as indicated in the figure. The rolling element 23 rests against a plurality of bearing spheres 40 which can move freely between the rolling element 23 and a support element 39.

When the piston element 22 is push sufficiently far out of the housing 18, so that the piece of furniture or the device 10 is lifted off the supporting surface 14 as indicated in the figure, the piece of furniture or the device 10 can be moved rolling across the supporting surface 14. When the piston element 22 is pulled completely into the cylinder space 34, the piece of furniture or the device 10 will rest on the foot element 42 of the stabilizing device 16.

The piston element 22 is connected to an actuator 30 which is movably arranged in an axial direction of the housing 18 such that the actuator can move the piston element 22 in and out of the cylinder space 34. The actuator 30 may be connected to a motor 31 directly or, as shown in FIG. 1, to the motor 31 via an actuator device 32 which in a well-known manner transfers the movement generated by the motor 31 to the actuator 30. The actuator device may for example comprise gear elements for transfer of a rotational movement of the shaft of the motor 31 to an axial movement of the actuator 30.

The stabilizing device 16 further comprises a control unit 28 which comprises a receiver device which is capable of receiving a wireless signal from a sender device, typically a remote control or a smart phone or a similar device which has an app installed for sending instructions or directions to the control unit 28. The sender device may also be for example a smart pad or a similar device, a computer device or a joy stick device, or it may simply be a person activating and controlling the wall system by using his or her voice or by employing one or more particular movements with his or her body. If necessary, to ensure that the control unit 28 receives the wireless signals, the receiver device may also be provided separately from the control unit, but signally connected to the control unit, wirelessly or with a signal cable, and be mounted to the piece of furniture or the device 10 in a suitable position.

The piece of furniture or the device 10 will often be provided with a plurality of stabilizing devices 16, and the stabilizing devices may be configured to communicate with each other in addition to the control unit 28. In that case the stabilizing device 16 is also provided with a sending device which is capable of sending a wireless signal that the other stabilizing devices 16 are capable of receiving.

The stabilizing device is also provided with at least one first sensor device 27 which is capable of sensing the load on the motor 31. Preferably the motor 31 is an electric motor and the at least one first sensor device 27 is preferably a sensor device that can measure the electric current that the motor 31 draws. When the piston element 22 is pushed into air, i.e. there is basically no resistance or weight to be lifted, the motor 31 will draw a very small current. As soon as the piston element 22 hits the supporting surface 14, the motor will have to lift the weight of the piece of furniture or the device 10 in order to push the piston element 22 further out of the cylinder space 34 and a substantially larger current will be drawn. As soon as this happens, the control unit 28 stops the movement of the piston element 22 and the piece of furniture or the device 10 is stabilized. The same principle is also valid if the piston elements 22 of two or more stabilizing devices 16 must be pushed out of the cylinder space 34 in order two stabilize the piece of furniture or device 10. The piston elements 22 are pushed out as long as there is virtually no resistance to the movement, but as soon as the motor of a stabilizing device 16 starts to draw a larger current, i.e. when the piston element contacts the supporting surface 14, the motor of that stabilizing device is stopped by the control unit 28. When the piston element 22 of all stabilizing devices are in contact with the supporting surface 14, the piece of furniture or the device 10 will be stabilized.

The stabilizer device 16 may also be provided with at least one second sensor device 26 which is capable of sensing the position in space. The at least one second sensor device 26 may also be provided in the piece of furniture or the device 10 itself, outside the stabilizing device 16, as long as the at least one second sensor device 26 is in signal communication with the control unit 28, either wirelessly or via a signal cable.

The at least one second sensor device 26, sensing the position of the piston 22 relative to the housing of the stabilizer device 16, can be used to level a first surface 13 of the piece of furniture or the device 10 if that is desired, for example the table top of a table, a washing machine or some other type of furniture, device or equipment that needs to be levelled. By calibrating the stabilizing devices with the first surface 13 of the piece of furniture or the device 10 so that the control unit knows the position of the piston elements within the housing 16 when the first surface 13 is level, i.e. lies in a horizontal plane, the piston elements 22 can be moved to the same position every time the piece of furniture or the device 10 needs to be levelled. In case the piece of furniture or the device 10 is placed on a supporting surface 14 which is not horizontal, the piece of furniture or the device may be provided with one or more second sensor devices 26, which are signally communicating with the control unit 28 and which are capable of sensing the position of for example the first surface 13 of the piece of furniture or the device 10 relative to a reference surface, typically a horizontal plane, such that the piston elements 22 of one, some or all the stabilizing devices 16 can be moved to a position necessary to obtain a levelled first surface 13. The at least one second sensor device 26 may comprise an accelerometer and/or a gyro and/or a magnetometer in order to determine the position of the first surface 13 of the piece of furniture or the device 10 relative to a reference surface.

Figure 2:
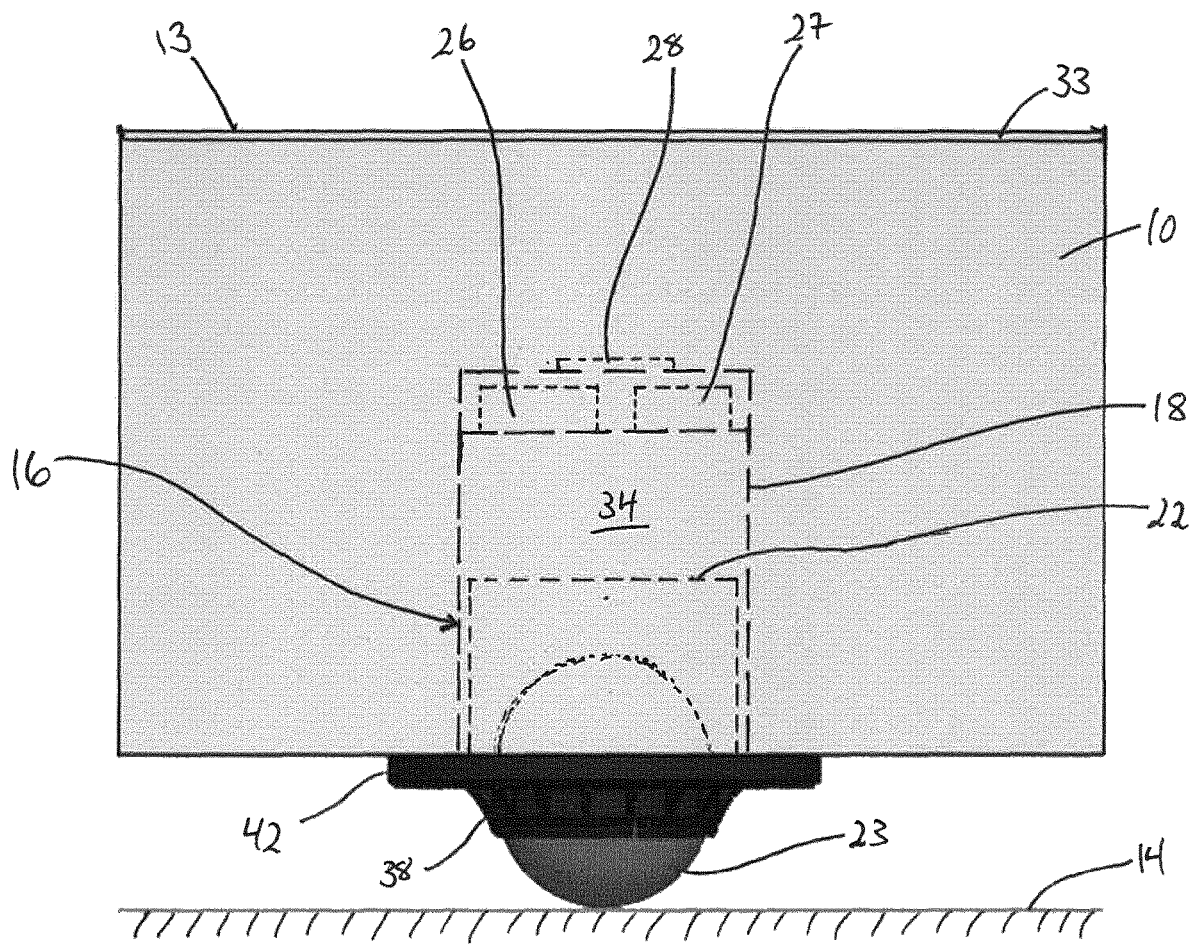
FIG. 2 is a simplified schematic illustration of a part of a piece of furniture or a device provided with a stabilizing device with a rolling element that is in contact with a supporting surface.
Figure 3:
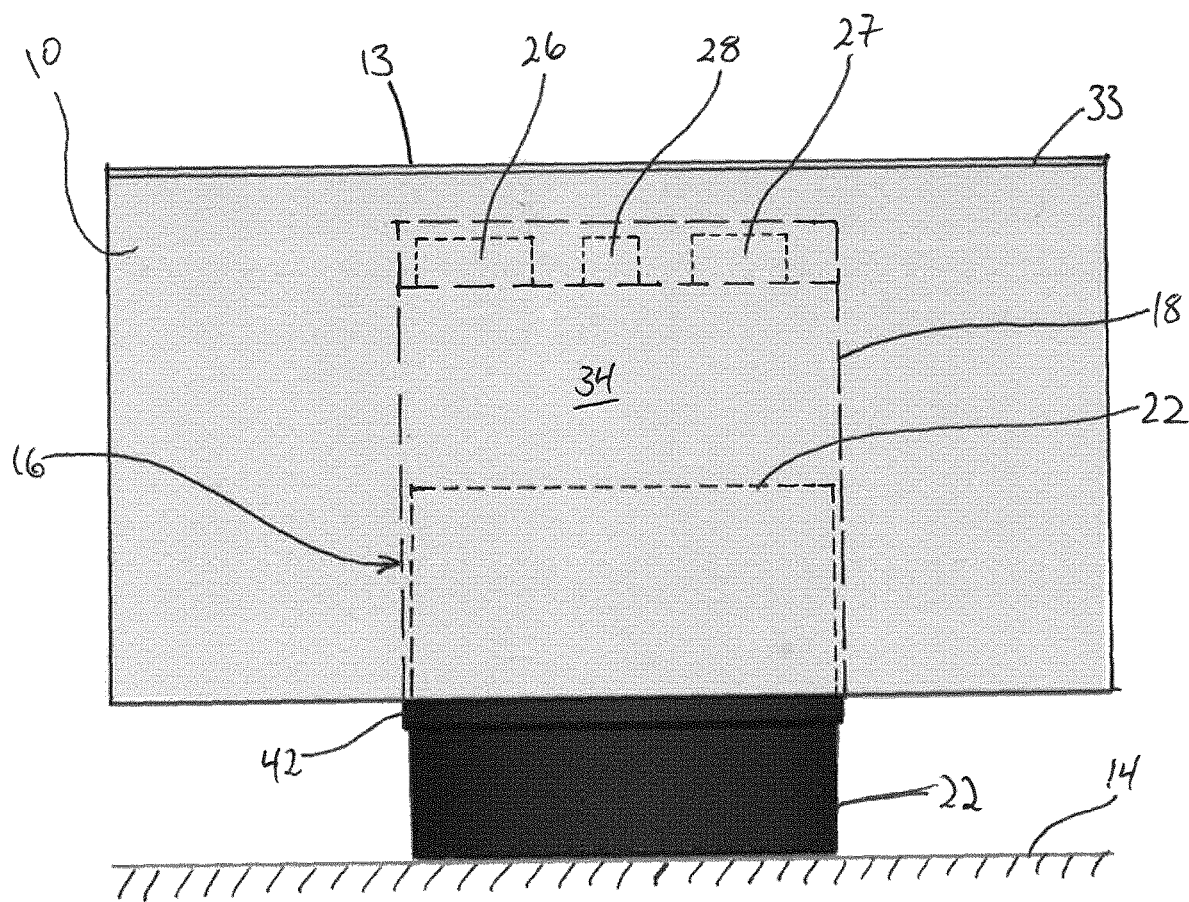
FIG. 3 is a simplified schematic illustration of a part of a piece of furniture or a device provided with a stabilizing device where a piston element is in contact with a supporting surface.

In FIGS. 2 and 3, two similar examples of a stabilizing device 16 mounted in a piece of furniture or a device 10 are shown. The stabilizing devices 16 are only shown very schematically, but they may be designed in a similar way to the example described above and shown in FIG. 1. The piece of furniture or the device 10 is shown in part only and may comprise a number of stabilizing devices 16.

The piece of furniture or the device 10 shown in FIGS. 2 and 3 comprises a stabilizing device 16. The stabilizing device 16 comprises a housing 18 with a cylinder space 34 that has a piston opening 19 (see FIG. 1) facing the supporting surface 14. In the cylinder space 34 there is provided a piston element 22 which is movable in and at least partly out of the cylinder space 34. The piston element 22 is moved by using a motor, preferably an electric motor, for example in a way similar to the one described above in connection with FIG. 1.

The embodiment of the stabilizing device 16 shown in FIG. 2, is provided with a rolling element 23 at the end of the piston element that faces the supporting surface 14. When piston is moved to its outer position, as shown in FIG. 2, the rolling element makes it possible to roll the piece of furniture or the device 10 across the supporting surface 14.

The stabilizing device 16 shown in FIG. 3, on the other hand, is not provided with a rolling element at the end of the piston element 22. Instead, the piston element 22 itself is moved out and is in contact with the supporting surface 14. The piston element 22 may be provided with a rubber element or a similar element at the end thereof to avoid any damage to the supporting surface 14 taking place.

The piston elements 22 of the stabilizing devices shown in FIGS. 2 and 3 can be moved completely into the cylinder space 34 so that the foot element 42 rests on the supporting surface 14 and the piece of furniture rests safely on the supporting surface 14.

The stabilizing device 16 further comprises a control unit 28 and the first sensor device 27 and the second sensor device 26 as described in connection with the example shown in FIG. 1. The first sensor device 27 and the second sensor device 26 are both signally connected to the control unit 28.

The first sensor device 27 is of a type that is capable of measuring the load on motor 31 of the stabilizing device 16. The motor 31 is preferably electric and the first sensor device 27 may then be a sensor device that is capable of measuring the electric current that the motor draws as explained in detail above. Typically the first sensor device 27, of all embodiments of the present invention, may comprise an ammeter.

The second sensor device 26 can be used to level the furniture top 33 of the piece of furniture or device 10 and thereby the first surface 13 as indicated in FIGS. 2 and 3. The second sensor device 26 may be included in the stabilizing device 16 or it may be provided in the piece of furniture or the device 10 itself. The second sensor device 26, in all embodiments of the present invention, may comprise one or more individual sensors, typically an accelerometer and/or a gyro and/or a magnetometer. Based on the measurements taken by the second sensor device 26 of the stabilizing devices 16 of the piece of furniture 10, the control unit 28 can calculate which piston elements 22 needs to be activated in order to level the first surface 13 of the piece of furniture or the device 10. By providing continuous feedback about the position of the first surface 13 relative to a horizontal plane to the control unit 28 during the process so that the control unit 28 can continuously adjust the movement of the piston elements 22 of the various stabilizing devices 16, the levelling of the first surface 13 can be carried out quickly and accurately.

The invention has been described above with reference to some non-limiting examples. A person skilled in the art will, however, understand that the invention, as it is described above and shown on the figures, may be modified and that changes can be made within the scope of the invention as it is defined in the claims.

The invention claimed is:

1. A piece of furniture or a device comprising:
   a stabilizing device for stabilization of the piece of furniture or the device on a supporting surface, the stabilizing device being mounted to or within the piece of furniture or the device, wherein the stabilizing device comprises
      a housing with a piston opening in one end of the housing, the piston opening being arranged to face the supporting surface on which the piece of furniture or the device is supported,
      a piston element which is mounted movably within the housing and movably at least partly out of the piston opening for engagement with the supporting surface, the piston element being connected to a motor for actuation of a movement of the piston element, wherein the piston element comprises a rolling element at the end of the piston element that faces the supporting surface,
      a control unit which is connected to the motor to transmit signals to the motor, for control of the actuation of the piston element,
      a receiver arranged for receiving a wireless signal, the wireless signal being a person's voice, a wireless signal from a remote control, or a wireless signal from a mobile phone, the receiver being connected to the control unit to transmit a received signal to the control unit, and
      at least one first sensor device that is capable of measuring a load on the motor, the at least one first sensor device being connected to the control unit to transmit signals to the control unit such that the movement of the piston element can be stopped based on a measured load from the at least one first sensor device indicating that the rolling element is in contact with the supporting surface;
   a first surface; and
   at least one second sensor device, the at least one second sensor device being capable of registering a position of the first surface or a position of the piston element within the housing, the at least one second sensor device being connected to the control unit to transmit signals to the control unit.

2. The piece of furniture or device according to claim 1, wherein the at least one first sensor device is a load measuring device which measures the load on the motor.

3. The piece of furniture or device according to claim 1, wherein the motor is an electric motor.

4. The piece of furniture or device according to claim 1, wherein the at least one first sensor device is adapted to measure an electric current that the motor is consuming.

5. The piece of furniture or device according to claim 1, wherein the stabilizing device is one of a plurality of stabilizing devices, and the control units of the plurality of stabilizing devices are interconnected and configured to transmit signals to each other.

6. The piece of furniture or device according to claim 5, wherein the control units of the plurality of stabilizing devices are interconnected and configured to transmit wireless signals to each other.

7. The piece of furniture or device according to claim 1, wherein the at least one second sensor device comprises an accelerometer and/or a gyro and/or a magnetometer.

8. A method for stabilizing the piece of furniture or device according to claim 1, the method comprising:
   positioning the piece of furniture or the device on the supporting surface;
   sending a wireless start signal to the receiver, whereby the control unit actuates the motor for movement of the piston element out of the housing of the stabilizing device until the piston element is in contact with the supporting surface; and
   stopping the movement of the piston element when the at least one first sensor device registers a load on the motor that exceeds a predetermined load.

9. A method for levelling the piece of furniture or device according to claim 1, the method comprising:
   positioning the piece of furniture or the device on the supporting surface;
   sending a wireless start signal to the receiver to level the piece of furniture or the device, whereby the control unit tests if the first surface of the piece of furniture or the device is parallel to a reference surface or not based on signals transmitted to the control unit by the at least one second sensor device; and
   in response to the control unit determining that the first surface is not parallel to the reference surface, moving the piston element of the stabilizing device out of or into its housing until the first surface of the piece of furniture or the device is parallel to the reference surface.

10. The method according to claim 9, further comprising locking the piston element being moved in or out of its housing in its position relative to the housing when the first surface of the piece of furniture or the device is parallel to the reference surface.

\* \* \* \* \*